(12) United States Patent
Barton et al.

(10) Patent No.: US 8,140,544 B2
(45) Date of Patent: Mar. 20, 2012

(54) INTERACTIVE DIGITAL VIDEO LIBRARY

(75) Inventors: Kerri Ann Barton, Austin, TX (US);
Susan Elise Lee, Austin, TX (US);
Venkatesan Ramamoorthy, Round Rock, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 12/203,188

(22) Filed: Sep. 3, 2008

(65) Prior Publication Data

US 2010/0057644 A1 Mar. 4, 2010

(51) Int. Cl.
*G06F 7/00* (2006.01)
*G06F 17/30* (2006.01)

(52) U.S. Cl. ......... 707/749; 707/899; 707/913; 434/365

(58) Field of Classification Search .................. 707/736, 707/748–749, 899, 913; 434/365
See application file for complete search history.

(56) References Cited

U.S. PATENT DOCUMENTS

| | | | |
|---|---|---|---|
| 5,537,141 A | 7/1996 | Harper et al. | |
| 5,835,667 A * | 11/1998 | Wactlar et al. | 386/241 |
| 6,464,501 B1 | 10/2002 | Strohecker et al. | |
| 6,493,690 B2 | 12/2002 | Bertrand et al. | |
| RE38,432 E | 2/2004 | Fai et al. | |
| 6,705,869 B2 | 3/2004 | Schwartz | |
| 6,729,885 B2 | 5/2004 | Stuppy et al. | |
| 6,733,295 B2 | 5/2004 | Stuppy et al. | |
| 6,755,662 B2 * | 6/2004 | Fujino et al. | 434/322 |
| 6,799,198 B1 | 9/2004 | Huboi et al. | |
| 6,904,263 B2 * | 6/2005 | Grudnitski et al. | 434/308 |
| 6,937,841 B1 | 8/2005 | Guy et al. | |
| 7,496,845 B2 * | 2/2009 | Deutscher et al. | 715/726 |
| 7,565,440 B2 * | 7/2009 | Omoigui | 709/231 |
| 7,702,508 B2 * | 4/2010 | Bennett | 704/257 |
| 7,873,258 B2 * | 1/2011 | Grosvenor | 386/241 |
| 2002/0059604 A1* | 5/2002 | Papagan et al. | 725/51 |
| 2002/0087530 A1* | 7/2002 | Smith et al. | 707/3 |
| 2003/0070176 A1* | 4/2003 | Parker et al. | 725/105 |
| 2003/0110215 A1* | 6/2003 | Joao | 709/203 |
| 2004/0063086 A1 | 4/2004 | Yang et al. | |
| 2004/0205477 A1* | 10/2004 | Lin | 715/500.1 |
| 2005/0193335 A1* | 9/2005 | Dorai et al. | 715/530 |
| 2006/0204942 A1 | 9/2006 | Kimball | |
| 2006/0218146 A1* | 9/2006 | Bitan et al. | 707/7 |
| 2007/0043766 A1* | 2/2007 | Nicholas et al. | 707/104.1 |
| 2008/0160490 A1* | 7/2008 | Gomes et al. | 434/350 |
| 2008/0259155 A1* | 10/2008 | McLelland et al. | 348/14.03 |
| 2009/0019078 A1* | 1/2009 | Chisholm et al. | 707/102 |
| 2009/0049077 A1* | 2/2009 | Lawlor | 707/102 |
| 2009/0138508 A1* | 5/2009 | Tolle et al. | 707/104.1 |

* cited by examiner

*Primary Examiner* — James Trujillo
*Assistant Examiner* — Jeffrey A Burke
(74) *Attorney, Agent, or Firm* — Yee & Associates, P.C.; Mark C. Vallone

(57) ABSTRACT

A system for increasing user interaction with a digital video library. In response to receiving a question by an interactive digital video library server from a user regarding course material being presented from a digital video library, it is determined whether the question is in an audio format. In response to determining that the question is in an audio format, the question is converted into a text format. The course material is searched in a time sliced video index database for an answer to the question using keywords found in the text format of the question. Also, other course materials similar to the course material are searched in a video knowledge base. A weight is assigned to each search result hit found in the course material and the other course materials. Search result hits are outputted in a priority order according to assigned weight and user preference.

18 Claims, 4 Drawing Sheets

INTERACTIVE DIGITAL VIDEO LIBRARY

BACKGROUND OF THE INVENTION

1. Field of the Invention

The present invention relates generally to an improved data processing system and more specifically to a computer implemented method, system, and computer usable program code for increasing user interaction with a digital video library system.

2. Description of the Related Art

Technology in computer-based Digital Video Library (DVL) education has improved significantly over the past few years to keep pace with the growing demand for the development and distribution of cost effective educational materials to students or learners in remote locations around the world. Today, online and digital-based learning technologies are able to simulate most aspects of a classroom environment, such as, for example, registering students for online learning sessions, delivering customized course content using a variety of delivery mechanisms, testing student retention of the course content, and recording, measuring, and monitoring student performance.

However, current distance learning technologies are not able to simulate classroom student/teacher interaction. Students taking pre-recorded video lessons find it difficult to be engaged with the course content. Also, when taking pre-recorded video lessons students are not actively encouraged to question the course material during the presentation. As a result, students with questions about the course material are limited in finding answers to their specific questions.

BRIEF SUMMARY OF THE INVENTION

According to one embodiment of the present invention, user interaction with a digital video library is increased. In response to receiving a question by an interactive digital video library server from a user regarding course material being presented from a digital video library, it is determined whether the question is in an audio format. In response to determining that the question is in an audio format, the question is converted from the audio format to a text format. The course material is searched in a time sliced video index database for an answer to the question using keywords found in the text format of the question. Other course materials similar to the course material are searched in a video knowledge base for the answer to the question using the keywords found in the text format of the question. A weight is assigned to each search result hit found in the course material and the other course materials. Search result hits are outputted in a priority order according to assigned weight and user preference.

DETAILED DESCRIPTION OF THE INVENTION

Figure 1:
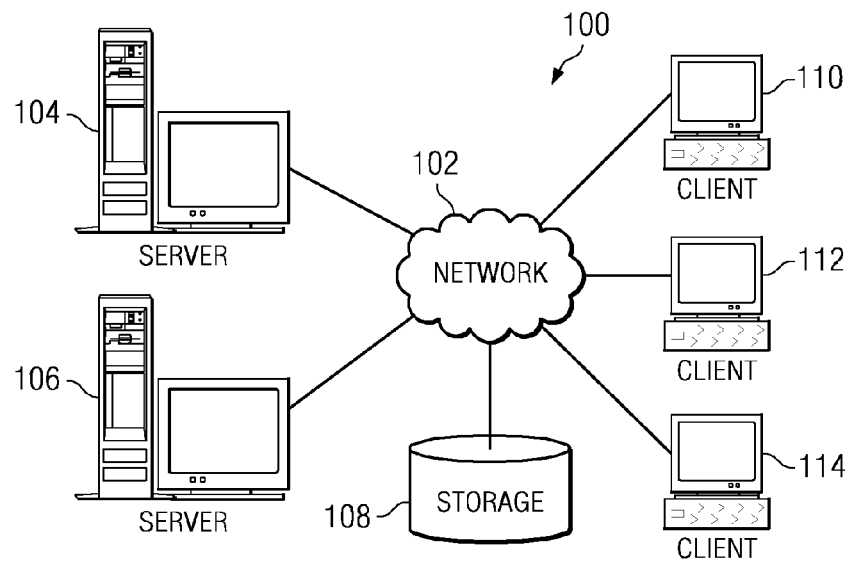
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
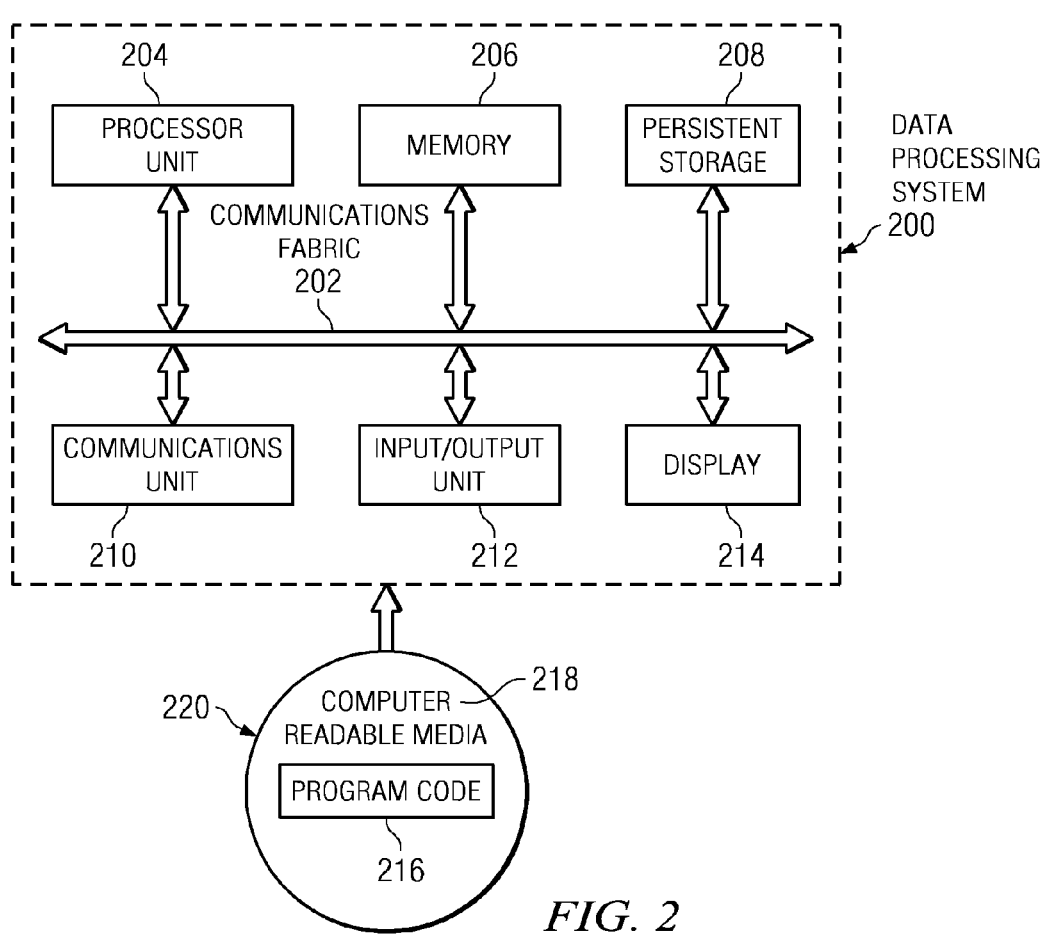
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be a database that stores a plurality of course content and/or distance learning materials for one or more educational institutions and/or providers of distance learning material.

Further, client devices 110, 112, and 114 also connect to network 102. Client devices 110, 112, and 114 may, for example, be personal computers, network computers, personal digital assistants (PDAs), or smart cellular telephones. Client devices 110, 112, and 114 are clients to server 104 and/or server 106 in this example.

Server 104 and server 106 may, for example, provide interactive course materials and keyword searches of those course materials to users of client devices 110, 112, and 114. Furthermore, server 104 and server 106 may provide other data, such as boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer-recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for allowing enhanced user interaction with a DVL. Illustrative embodiments allow enhanced user interaction with the DVL by: displaying a course material video to a user; stopping presentation of the video in response to the user asking a question regarding the course material; searching a time sliced video index database for an answer to the user's question using keywords found in the text of the question; determining whether one or more matches exist above a predetermined threshold between the text of the user's question and one or more records stored in the time sliced video index database; determining how search hits are to be output to the user using, for example, user preference settings or user profile data, in response to determining that one or more matches do exist; and displaying that portion of the course material video that answers the user's question.

Illustrative embodiments allow for a real-time question and answer environment by achieving a two-way communication medium that improves the educational experience for users. In addition, illustrative embodiments record questions posed by users and the contextual details, such as the location and timestamp within the video presentation, when the questions were asked. Further, illustrative embodiments generate a list of possible answers to the questions by searching through an index of the course materials being presented.

Moreover, illustrative embodiments may connect seemingly independent users to coordinate participation of these users in a course at a mutually-agreed upon time. Illustrative embodiments may rely on student preferences, rather than administrator preferences, to decide when to start a course. Thus, illustrative embodiments may allow users in different locations to take pre-recorded video courses at the same time, which may allow these users to collaborate amongst each other by asking and answering questions on an ad-hoc basis. As a result, illustrative embodiments make this video learning process more interactive.

However, it should be noted that illustrative embodiments are not intended to change the media used to deliver the course materials nor are illustrative embodiments meant to change the way courses are offered. Rather, illustrative embodiments provide an improved interactive capability. In addition, if illustrative embodiments are not able to find an answer to a posed question, then the illustrative embodiments may send the question to a course instructor or content developer for review and possible editing of the course material. Also, illustrative embodiments may record individual or group question and answer exchanges so that future students may see a historical log of what was asked, when it was asked, and by whom.

Consequently, illustrative embodiments transform a static course delivery format into a more interactive format. Furthermore, illustrative embodiments may enhance course materials by providing an improved feedback structure and recording the locations within the presentation of course materials where questions are being asked. As a result, illustrative embodiments may increase user satisfaction and retention of course materials.

Figure 3:
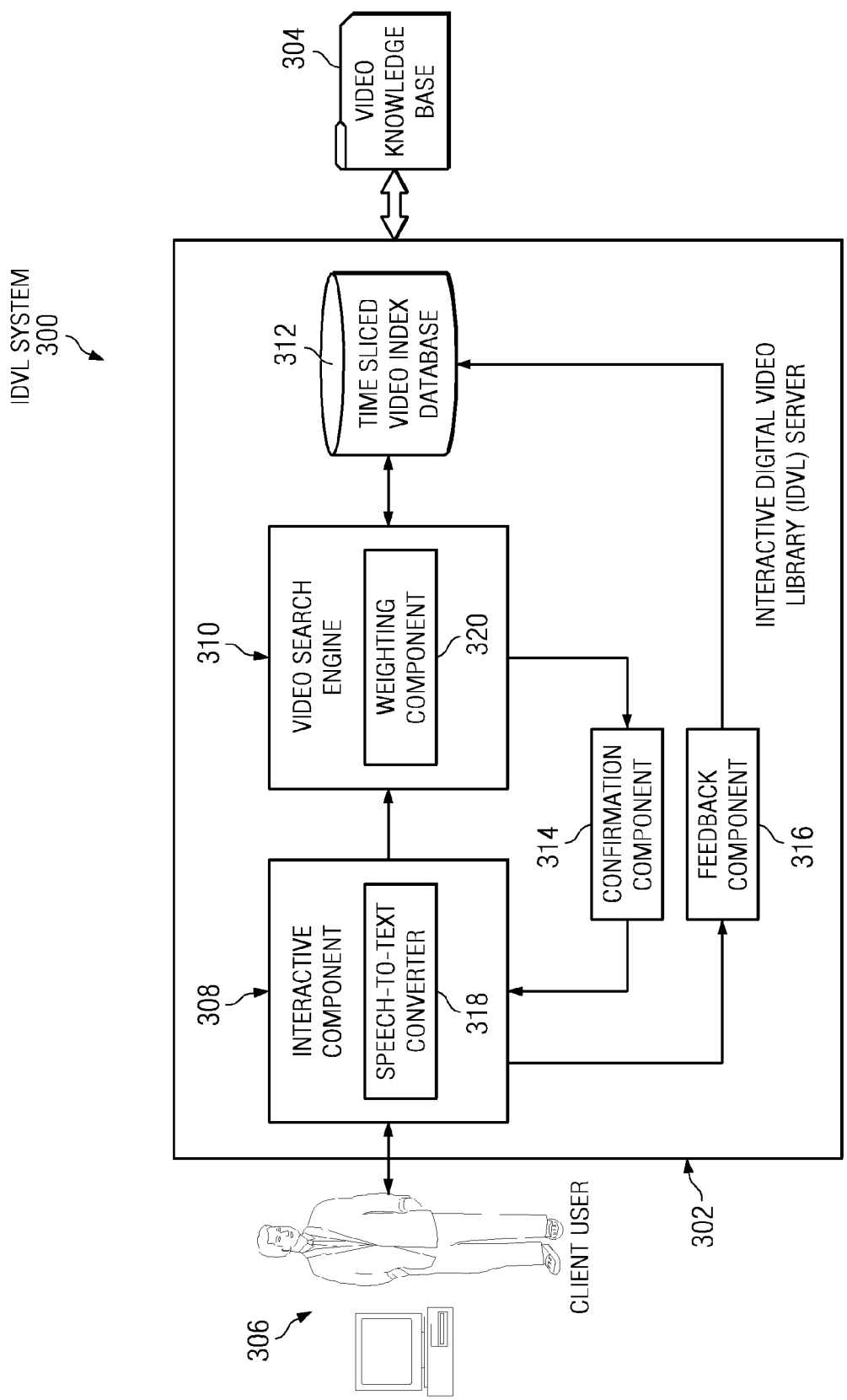
FIG. 3 is a diagram of an interactive video library system in accordance with an illustrative embodiment.

With reference now to FIG. 3, a diagram of an interactive digital video library system is depicted in accordance with an illustrative embodiment. Interactive digital video library (IDVL) system 300 may, for example, be implemented in network data processing system 100 in FIG. 1. IDVL system 300 is a system of components that provide digital video course presentations or distance learning materials to a plurality of users/students/learners using client devices. IDVL system 300 includes IDVL server 302 and video knowledge base 304.

IDVL server 302 may, for example, be server 104 in FIG. 1. IDVL server 302 is the component within IDVL system 300 that manages and controls processes of illustrative embodiments. IDVL server 302 includes interactive component 308, video search engine 310, time sliced video index database (DB) 312, confirmation component 314, and feedback component 316.

IDVL server 302 uses interactive component 308 to receive queries or questions regarding course materials being presented on client devices, such as client devices 110-114 in FIG. 1, from users, such as client user 306. The course material may be presented to client user 306 via, for example, a digital video disc (DVD) being played on the client device. Alternatively, IDVL server 302 or another server, such as server 106 in FIG. 1, may present the course material to the user online via, for example, the Internet.

Interactive component 308 displays a text box or text field to client user 306 so that client user 306 may type in the query or question regarding the course material being presented. Alternatively, interactive component 308 may receive the question in a verbal format from client user 306. If the question is in a verbal format, interactive component 308 utilizes speech-to-text converter 318 to convert the question from a verbal format to a text format. In addition, interactive component 308 outputs query search results to client user 306 via, for example, a display screen or a printer, such as display 214 or input/output unit 212 in FIG. 2.

IDVL server 302 utilizes video search engine 310 to search time sliced video index DB 312 for an answer or a set of answers that match keywords found within the text of the query or question posed by client user 306. Time sliced video index DB 312 is a storage device that indexes video course materials by time slices or segments so that video search engine 310 may locate specific content relating to a query during a keyword search. After searching time sliced video index DB 312, video search engine 310 may return a list of hits or locations within the course material being presented to client user 306 that may answer the posed question. The one or more locations of possible answers within the course material may be identified by, for example, timestamp.

Video search engine 310 may also search video knowledge base 304 for hits of possible answers to the posed question. Video knowledge base 304 may represent one or more local and/or remote video databases that contain a plurality of other course materials. These other course materials in video knowledge base 304 may include content that is similar to the course content found within time sliced video index database 312. This similar course content may, for example, be provided by different instructors or different providers of learning materials. In other words, the similar course content may not be exactly the same as what is included within time sliced video index database 312, but covers similar subject matter or topics.

After receiving any search hits of possible answers to the query, video search engine 310 utilizes weighting component 320 to assign a weight to each search result hit. For example, weighting component 320 may assign a higher weight to a search hit that answered one or more previously posed questions, which were in close proximity to where the current question was asked by client user 306 during the presentation of the course material. Weighting component 320 uses the assigned weights to organize the search result hits into a prioritized or ranked list of possible answers to the posed question.

IDVL server 302 utilizes confirmation component 314 to receive the weighted list of search result hits from video search engine 310. Confirmation component 314 confirms that client user 306 is authorized to receive content within the weighted list of search result hits. For example, confirmation component 314 may confirm that client user 306 previously paid for the course material currently being presented to client user 306. Also, confirmation component 314 may verify that client user 306 is eligible to receive course content from video knowledge base 304 before providing search hits found in video knowledge base 304.

In addition, confirmation component 314 may utilize preference settings or profile data set by client user 306 to determine how to output the weighted list of possible answers to the posed question. For example, a preference setting may direct confirmation component 314 to always output only the search result hit with the highest weighting or ranking in the list. As another example, a preference setting may direct confirmation component 314 to always output the search result when only one hit is retuned in response to a query. As a further example, a preference setting may direct confirmation component 314 to always prompt client user 306 for search result selections or output preferences.

After confirming that client user 306 is authorized to receive the course material and determining the output preference settings, confirmation component 314 sends the weighted list of search results hits of possible answers to interactive component 308 for review and selection by client user 306. In addition to displaying the weighted list of search result hits, interactive component 308 may also provide fees, if any, associated with viewing certain content in the search result from video knowledge base 304.

IDVL server 302 utilizes feedback component 316 to receive feedback from client user 306. Feedback provides IDVL server 302 with information, such as, for example, the amount of satisfaction client user 306 received from the search result hits or whether any of the search result hits answered the posed question. IDVL server 302 may use this feedback to alert instructors or content developers on ways to update and improve the course material.

As an exemplary illustration, a student, such as client user 306, which is taking a DVL class, poses a question to interactive component 308 either verbally or textually regarding the presented course material. It should be noted that the presentation of the course material is stopped at this point. Also, interactive component 308 may, for example, confirm the question with the student before sending the question to video search engine 310. Afterward, video search engine 310 searches the course material being presented for a possible answer or set of answers based on keywords found in the query. In addition, video search engine 310 may also search similar course materials for an answer.

Then, weighting component 320 ranks the search result hits by relevancy and weight on inline proximity to other questions previously asked at the same point in time during the presentation of the course material. Thus, weighting component 320 creates an output for the student that lists likely answers to the question based on weightings. After the student is satisfied with the provided answer or set of answers to the posed question, the video presentation of the course material again resumes playing.

Further, IDVL server 302 may provide the student with a list of previous questions and answers from other students. Feedback component 316 provides a mechanism for the student to confirm whether the question was answered to the student's satisfaction. If the student is dissatisfied with the provided answer, the student may initiate another search or search other course materials not previously searched. Furthermore, feedback component 316 may provide a mechanism for teachers and content developers to send the student, for example, an e-mail that contains the correct answer not previously found by IDVL server 302.

Moreover, IDVL server 302 may record the entire exchange of questions and answers regarding specific course materials and send the exchange to content developers to improve the course content for future students. In addition, IDVL server 302 may send the exchange to other interested students currently taking the course. Further, IDVL server 302 may embed an icon or link within the course material that captures the exchange to allow other students to read the questions and gain from the previously supplied answers.

In another exemplary illustration, a student registers to begin a DVL class. During registration, the student may provide IDVL server 302 with a student profile, which may include preference settings. The student profile may be tied to an avatar. The avatar may, for example, be color coded. A green avatar may represent an inexperienced student (i.e., a student never having taken similar courses) and a red avatar may represent an advanced student (i.e., a graduate student in the same field as the course material).

In addition, IDVL server 302 may allow the student the option to wait for other interested students to register for the course before beginning the course. Alternatively, IDVL server 302 may detect other students currently taking the same course material and then automatically link these students together to form a "class." Thus, IDVL server 302 may coordinate a mutually-agreed upon time so that multiple students in independent locations may take the course material at a same time together.

Also, IDVL server 302 may create a customized virtual classroom, which allows students to see the experience level and background of fellow students to encourage networking, recognition, and profiling of students. Once the "class" begins, students may ask questions about the course material and share responses amongst the other students. In addition, students may ask questions of other students and communicate with each other about the course material.

Further, IDVL server 302 may generate a record of the shared exchanges, which may then be provided to other interested students or to content developers as feedback. Furthermore, IDVL server 302 may embed the discussions as branches off of the course material to link in past or future exchanges. Moreover, IDVL server 302 may monitor whether previous questions were answered and send a student that did not receive an answer to a question the answer if subsequently found or provided by a content developer.

Figure 4:
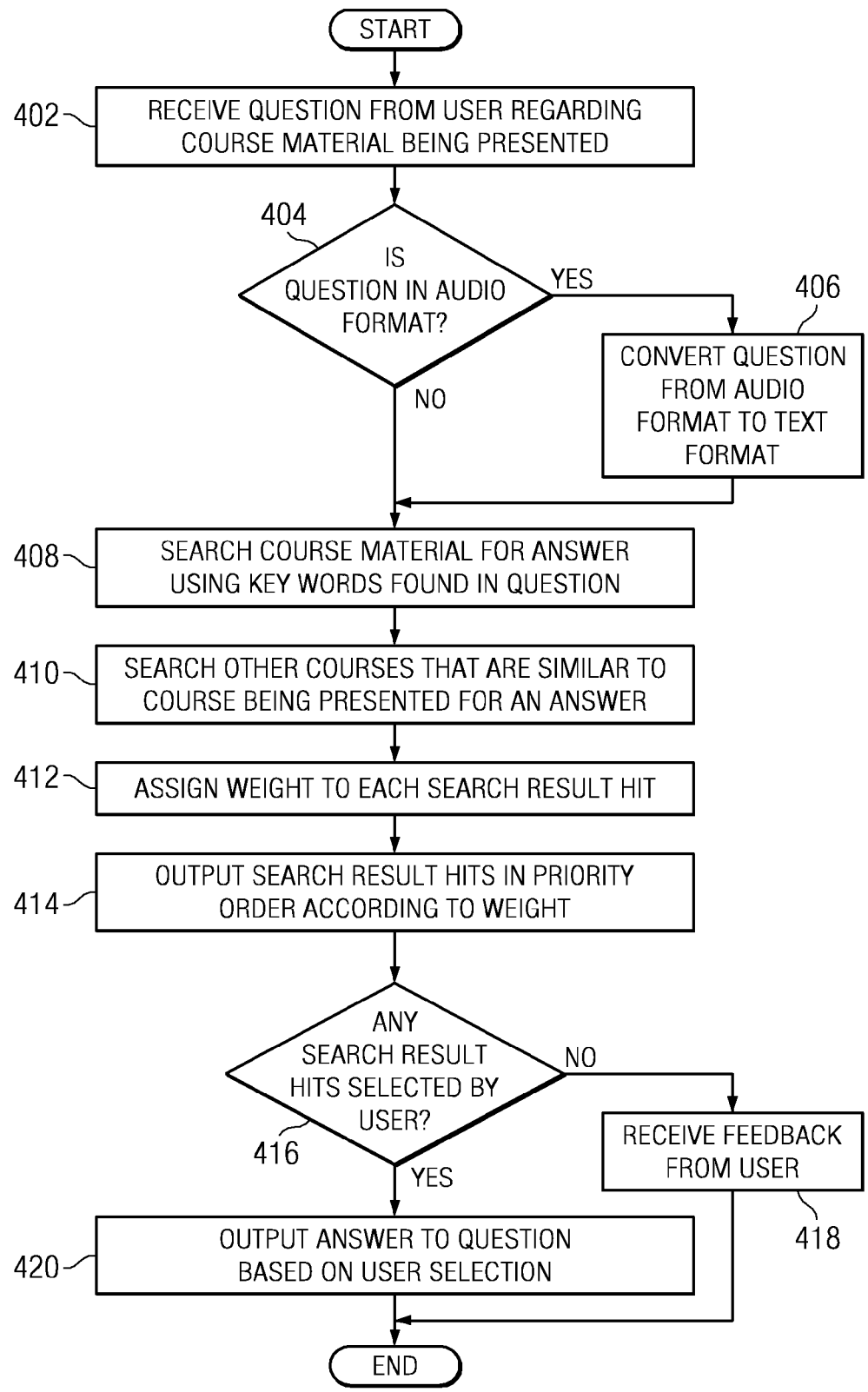
FIG. 4 is a flowchart illustrating an exemplary process for increasing user interaction with a digital video library in accordance with an illustrative embodiment.

With reference now to FIG. 4, a flowchart illustrating an exemplary process for increasing user interaction with a digital video library is shown in accordance with an illustrative embodiment. The process shown in FIG. 4 may be implemented in an IDVL server, such as IDVL server 302 in FIG. 3.

The process begins when the IDVL server utilizes an interactive component, such as interactive component 308 in FIG. 3, to receive a question from a user of a client device, such as client user 306 in FIG. 3, regarding course material being presented to the user on the client device (step 402). Then, the IDVL server makes a determination as to whether the question is in an audio format (step 404). If the question is in an audio format, yes output of step 404, then the interactive component utilizes a speech-to-text converter, such as speech-to-text converter 318 in FIG. 3, to convert the posed question from an audio format to a text format (step 406). Thereafter, the process proceeds to step 408.

If the question is not in an audio format, no output of step 404, then the IDVL server utilizes a video search engine, such as video search engine 310 in FIG. 3, to search the course material in a time sliced video index database, such as time sliced video index database 312 in FIG. 3, for an answer using keywords found in the text of the question (step 408). In addition, the video search engine searches other courses that are similar to the course material being presented to the user in one or more local or remote video knowledge bases, such as video knowledge base 304 in FIG. 3, for an answer (step 410). Then, the video search engine uses a weighting component, such as weighting component 320 in FIG. 3, to assign a weight to each search result hit and organize the possible answers into a weighted list (step 412).

Afterward, the interactive component outputs the weighted list of search result hits in a priority order according to weight for the client user to review (step 414). Subsequently, the interactive component makes a determination as to whether the client user selected any search result hits within the weighted list (step 416). If the client user did not select any of the search result hits, no output of step 416, then the IDVL server utilizes a feedback component, such as feedback component 316, to receive feedback from the client user regarding the search results (step 418). Thereafter, the process terminates. If the client user did select one or more of the search result hits, yes output of step 416, then the interactive component outputs the answer to the question based on the user's selection from the prioritized search result list (step 420). Thereafter, the process terminates.

Figure 5:
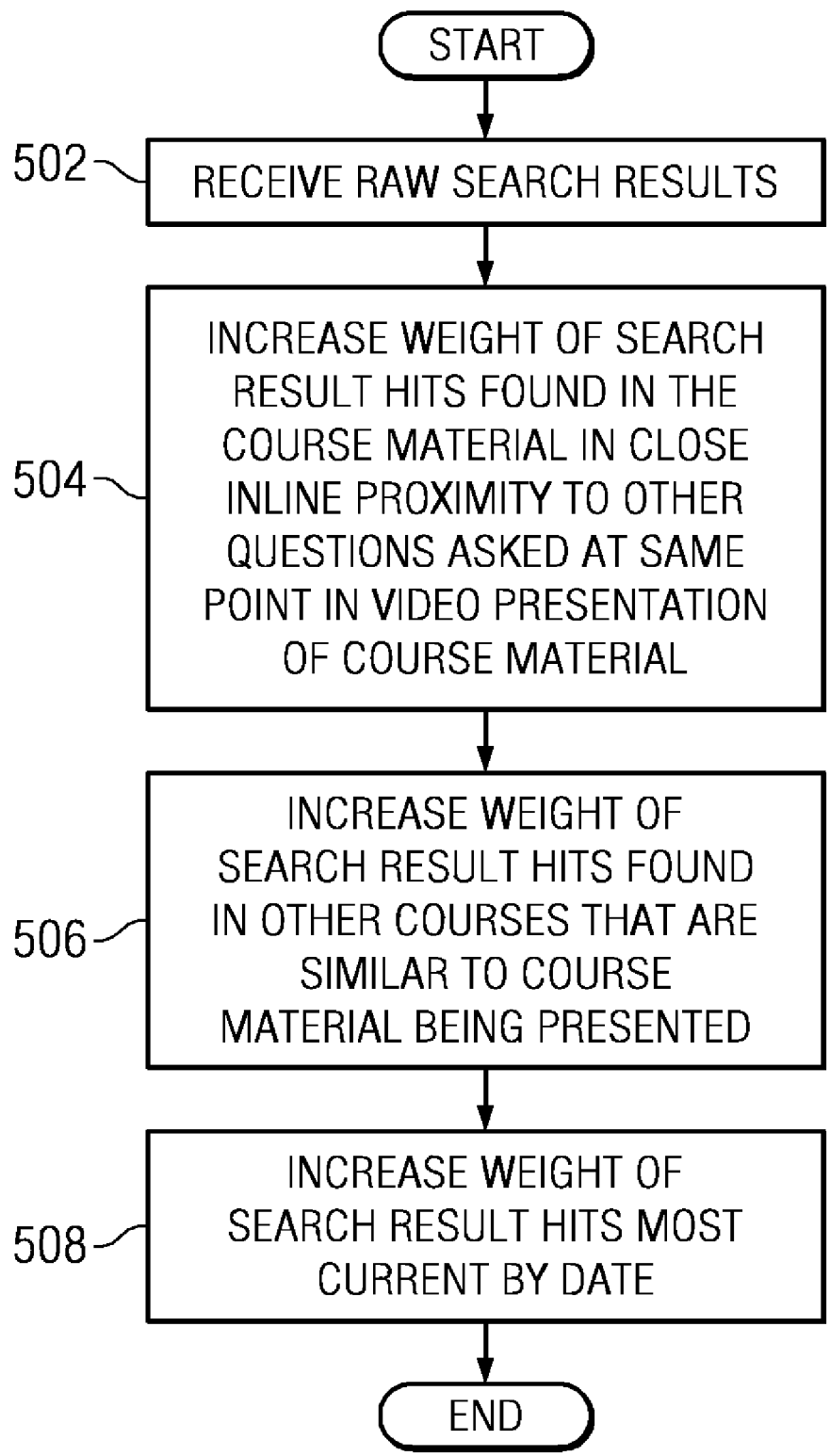
FIG. 5 is a flowchart illustrating an exemplary process for assigning weight to search result hits in accordance with an illustrative embodiment.

With reference now to FIG. 5, a flowchart illustrating an exemplary process for assigning weight to search result hits is shown in accordance with an illustrative embodiment. The process shown in FIG. 5 may be implemented in a video search engine, such as video search engine 310 in FIG. 3. Also, the process shown in FIG. 5 may be implemented in step 412 of FIG. 4.

The process begins when the video search engine utilizes a weighting component, such as weighting component 320 in FIG. 3, to receive raw search results to a query or question posed by a user of a client device, such as client user 306 in FIG. 3, regarding course material being presented (step 502). After receiving the raw search results in step 502, the weighting component increases the weight or priority of search result hits found in the course material in close inline proximity to other questions asked by other users at the same point in the video presentation of the course material (step 504). In addition, the weighting component increases the weight of search result hits found in other courses that are similar to the course material being presented (step 506). Further, the weighting component increases the weight of search result hits most current by date (step 508). In other words, the weighting component assigns search result hits from course material with newer publication dates with a higher weight and course materials with older publication dates with a lower weight. Moreover, the weighting component may assign higher weight to search result hits from course materials with high user feedback or course materials with a high user request rate. The process terminates thereafter.

Thus, illustrative embodiments of the present invention provide a computer implemented method, system, and computer program product for increasing user interaction with a digital video library system. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer-readable data storage medium can be any tangible apparatus that can store the program for use by or in connection with the instruction execution system, apparatus, or device.

The computer-readable data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for increasing user interaction with a digital video library, the method comprising the steps of:
responsive to a server computer receiving a question from a user regarding course material being presented from a digital video library, determining, by server computer, whether the question is in an audio format;
responsive to the server computer determining that the question is in an audio format, converting, by server computer, the question from the audio format to a text format;
searching, by the server computer, the course material in a storage device for an answer to the question using keywords found in the text format of the question, wherein the storage device comprises video course materials indexed by time slices or segments;
responsive to the server computer receiving raw search results from the searching, assigning, by the server computer, a weight to each search result hit found in the course material;
increasing, by the server computer, the assigned weight of each search result hit found in the course material in close inline proximity to other questions asked at a same point in a video presentation of the course material; and
outputting, by the server computer, search result hits in a priority order according to the assigned weight.

2. The method of claim 1, further comprising the steps of:
determining, by the server computer, whether the user selected one or more search result hits as a possible answer for the question;
responsive to the server computer determining that the user selected one or more search result hits, outputting, by the server computer, the answer to the question based on the one or more search result hits selected by the user.

3. The method of claim 1, further comprising the steps of:
searching, by the server computer, other course materials similar to the course material in a video knowledge base for the answer to the question using the keywords found in the text format of the question;
responsive to the server computer receiving raw search results from searching the other course materials similar to the course material in the video knowledge base, assigning, by the server computer, a weight to each search result hit found in the other course materials; and
increasing, by the server computer, the assigned weight of each search result hit found in the other course materials similar to the course material being presented.

4. The method of claim 1, further comprising the step of:
the server computer recording a question and answer exchange between the user and the server computer regarding the course material being presented and a timestamp location within a video presentation of the course material where the question and answer exchange occurred.

5. The method of claim 4, further comprising the step of:
the server computer embedding an icon that links to the recorded question and answer exchange at the timestamp location so that other interested users may link to the recorded question and answer exchange to review.

6. The method of claim 1, further comprising the step of:
the server computer notifying a content developer to send an e-mail to the user with a correct answer to the question in response to the correct answer not being found in the course material by the server computer.

7. The method of claim 1, further comprising the steps of:
the server computer detecting two or more users taking the course material at a same time; and
the server computer linking the two or more users together to allow collaboration between the two or more users.

8. The method of claim 1, wherein the server computer includes an interactive component, a video search engine, the storage device, a confirmation component, and a feedback component.

9. The method of claim 8, wherein the interactive component includes a speech-to-text converter, and wherein the video search engine includes a weighting component that assigns weights to the search result hits, and wherein the confirmation component confirms that the user is authorized to receive the course material.

10. The method of claim 1, further comprising the steps of:
   determining, by the server computer, whether the user selected one or more search result hits as a possible answer for the question; and
   responsive to the server computer determining that the user did not select one or more search result hits, receiving, by the server computer, feedback from the user regarding the search result hits.

11. A computer system for increasing user interaction with a digital video library, the computer system comprising:
   one or more processors, one or more computer-readable memories, and one or more computer-readable tangible storage devices;
   program instructions, stored on at least one of the one or more computer-readable tangible storage devices for execution by at least one of the one or more processors via at least one of the one or more computer-readable memories, to determine whether a question from a user regarding course material being presented from a digital video library is in an audio format in response to receiving the question;
   program instructions, stored on at least one of the one or more computer-readable tangible storage devices for execution by at least one of the one or more processors via at least one of the one or more computer-readable memories, to convert the question from the audio format to a text format in response to determining that the question is in an audio format;
   program instructions, stored on at least one of the one or more computer-readable tangible storage devices for execution by at least one of the one or more processors via at least one of the one or more computer-readable memories, to search the course material, in a storage device comprising video course materials indexed by time slices or segments, for an answer to the question using keywords found in the text format of the question;
   program instructions, stored on at least one of the one or more computer-readable tangible storage devices for execution by at least one of the one or more processors via at least one of the one or more computer-readable memories, to assign a weight to each search result hit found in the course material in response to receiving raw search results from searching the course material in the storage device;
   program instructions, stored on at least one of the one or more computer-readable tangible storage devices for execution by at least one of the one or more processors via at least one of the one or more computer-readable memories, to increase the assigned weight of each search result hit found in the course material in close inline proximity to other questions asked at a same point in a video presentation of the course material; and
   program instructions, stored on at least one of the one or more computer-readable tangible storage devices for execution by at least one of the one or more processors via at least one of the one or more computer-readable memories, to output search result hits in a priority order according to the assigned weight.

12. The computer system of claim 11, further comprising:
   program instructions, stored on at least one of the one or more computer-readable tangible storage devices for execution by at least one of the one or more processors via at least one of the one or more computer-readable memories, to determine whether the user selected one or more search result hits as a possible answer for the question;
   program instructions, stored on at least one of the one or more computer-readable tangible storage devices for execution by at least one of the one or more processors via at least one of the one or more computer-readable memories, to, in response to determining that the user selected one or more search result hits, output the answer to the question based on the one or more search result hits selected by the user; and
   program instructions, stored on at least one of the one or more computer-readable tangible storage devices for execution by at least one of the one or more processors via at least one of the one or more computer-readable memories, to receive feedback from the user regarding the search result hits in response to determining that the user did not select one or more search result hits.

13. The computer system of claim 11, further comprising:
   program instructions, stored on at least one of the one or more computer-readable tangible storage devices for execution by at least one of the one or more processors via at least one of the one or more computer-readable memories, to search other course materials similar to the course material in a video knowledge base for the answer to the question using the keywords found in the text format of the question;
   program instructions, stored on at least one of the one or more computer-readable tangible storage devices for execution by at least one of the one or more processors via at least one of the one or more computer-readable memories, to assign a weight to each search result hit found in the other course materials in response to receiving raw search results from searching the other course materials similar to the course material in the video knowledge base; and
   program instructions, stored on at least one of the one or more computer-readable tangible storage devices for execution by at least one of the one or more processors via at least one of the one or more computer-readable memories, to increase the assigned weight of each search result hit found in the other course materials similar to the course material being presented.

14. A computer program product for increasing user interaction with a digital video library, the computer program product comprising:
   one or more computer-readable tangible storage devices;
   program instructions, stored on at least one of the one or more computer-readable tangible storage devices, to determine whether a question from a user regarding course material being presented from a digital video library is in an audio format in response to receiving the question;
   program instructions, stored on at least one of the one or more computer-readable tangible storage devices, to convert the question from the audio format to a text format in response to determining that the question is in an audio format;
   program instructions, stored on at least one of the one or more computer-readable tangible storage devices, to search the course material, in a storage device comprising video course materials indexed by time slices or segments, for an answer to the question using keywords found in the text format of the question;
   program instructions, stored on at least one of the one or more computer-readable tangible storage devices, to assign a weight to each search result hit found in the course material in response to receiving raw search results from searching the course material in the storage device;

program instructions, stored on at least one of the one or more computer-readable tangible storage devices, to increase the assigned weight of each search result hit found in the course material in close inline proximity to other questions asked at a same point in a video presentation of the course material; and program instructions, stored on at least one of the one or more computer-readable tangible storage devices, to output search result hits in a priority order according to the assigned weight.

15. The computer program product of claim 14, further comprising:

program instructions, stored on at least one of the one or more computer-readable tangible storage devices, to determine whether the user selected one or more search result hits as a possible answer for the question;

program instructions, stored on at least one of the one or more computer-readable tangible storage devices, to, in response to determining that the user selected one or more search result hits, output the answer to the question based on the one or more search result hits selected by the user selection; and program instructions, stored on at least one of the one or more computer-readable tangible storage devices, to receive feedback from the user regarding the search result hits in response to determining that the user did not select one or more search result hits.

16. The computer program product of claim 14, further comprising:

program instructions, stored on at least one of the one or more computer-readable tangible storage devices, to search other course materials similar to the course material in a video knowledge base for the answer to the question using the keywords found in the text format of the question;

program instructions, stored on at least one of the one or more computer-readable tangible storage devices, to assign a weight to each search result hit found in the other course materials in response to receiving raw search results from searching the other course materials similar to the course material in the video knowledge base; and program instructions, stored on at least one of the one or more computer-readable tangible storage devices, to increase the assigned weight of each search result hit found in the other course materials similar to the course material being presented.

17. The computer program product of claim 14, further comprising:

program instructions, stored on at least one of the one or more computer-readable tangible storage devices, to record a question and answer exchange between the user and a server computer regarding the course material being presented and a timestamp location within a video presentation of the course material where the question and answer exchange occurred.

18. The computer program product of claim 17, further comprising:

program instructions, stored on at least one of the one or more computer-readable tangible storage devices, to embed an icon that links to the recorded question and answer exchange at the timestamp location so that other interested users may link to the recorded question and answer exchange to review.

* * * * *